(12) United States Patent
Forbes et al.

(10) Patent No.: US 7,770,137 B2
(45) Date of Patent: Aug. 3, 2010

(54) METHODS, SYSTEMS AND COMPUTER PROGRAM PRODUCTS FOR ENHANCING PRESENCE SERVICES

(75) Inventors: Stephen Kight Forbes, Raleigh, NC (US); Kurt Schmidt, Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 291 days.

(21) Appl. No.: 11/613,606

(22) Filed: Dec. 20, 2006

(65) Prior Publication Data

US 2008/0155476 A1 Jun. 26, 2008

(51) Int. Cl.
*G06F 3/14* (2006.01)
(52) U.S. Cl. .................. 715/864; 715/835; 455/3.04; 455/229; 455/435.1; 455/457; 455/456.1; 455/456.3; 455/456.6
(58) Field of Classification Search .......... 715/835, 715/864; 455/435.1, 457, 3.04, 229, 456.1, 455/456.3, 456.6
See application file for complete search history.

(56) References Cited

U.S. PATENT DOCUMENTS

| | | | |
|---|---|---|---|
| 6,947,976 B1* | 9/2005 | Devitt et al. | 709/219 |
| 2002/0107027 A1* | 8/2002 | O'Neil | 455/456 |
| 2003/0004802 A1* | 1/2003 | Callegari | 705/14 |
| 2005/0130680 A1* | 6/2005 | Northcutt | 455/457 |
| 2007/0291859 A1* | 12/2007 | Maes | 375/256 |
| 2008/0086361 A1* | 4/2008 | Eliezerov | 705/10 |

FOREIGN PATENT DOCUMENTS

| WO | WO 03/084258 A1 | 10/2003 |
|---|---|---|
| WO | WO 2006/060342 A2 | 6/2006 |

OTHER PUBLICATIONS

International Search Report and Written Opinion for PCT/US2007/015798; Jan. 2, 2008.
Schulzrinne et al. "RPID: Rich Presence Extensions to the Presence Information Data Format (PIDF) draft-left-simple-mid-10" *IETF Standard-Working Draft, Internet Engineering Task Force, IETF, CH*, vol. simple (10):1-39 (2005).

* cited by examiner

*Primary Examiner*—Boris Pesin
*Assistant Examiner*—Shen Shiau
(74) *Attorney, Agent, or Firm*—Myers Bigel Sibley & Sajovec, P.A.

(57) ABSTRACT

Provided are methods, systems, and computer program products for enhancing presence services. Such methods may include associating, in a database, a custom icon associated with a third party and a region and communicating a user presence in the associated region by transmitting a custom icon to a subscriber. Such systems may include a presence server configured to determine and communicate, to a subscriber, presence information corresponding to a user mobile device and an icon server configured to associate and store presence information of a third party and a custom icon corresponding to the third party, to modify the custom icon responsive to received data indicative of opinion data corresponding to the third party, and to transmit the custom icon to the user mobile device and to the subscriber.

18 Claims, 7 Drawing Sheets

METHODS, SYSTEMS AND COMPUTER PROGRAM PRODUCTS FOR ENHANCING PRESENCE SERVICES

FIELD OF THE INVENTION

The present invention relates to electronic devices and, more particularly, to electronic devices, methods, systems and computer program products related to mobile electronic devices.

BACKGROUND

Users of mobile electronic devices can communicate with one another on a variety of levels and using a variety of technologies. For example, presence service is a network service which accepts, stores and distributes presence information. Presence information may be a status indicator that conveys ability and willingness of a potential communication partner, a user for example, to communicate. A user may provide presence information via network connection to a presence service, which is stored in what constitutes his personal availability record and can be made available for distribution to subscribers to convey his availability for communication.

Presence information may have wide application in many communication services, including, for example, instant messaging and/or recent implementations of voice over IP. Presence service may be implemented in a single server or have an internal structure involving multiple servers and/or proxies. There may be complex patterns of redirection and proxying while retaining logical connectivity to a single presence service. Also presence service may be implemented as direct communication among users and subscribers, i.e. a server is not required.

Presence service may be implemented using, for example, sessions, which may be generally be described as either a lasting connection using the session layer of a network protocol or a lasting connection between a user and a peer, typically a server. A session may involve the exchange of many packets between the user's computer and the server. A session may be implemented as a layer in a network protocol using, for example, Session Initiation Protocol (SIP), an application-layer control (signaling) protocol for creating, modifying, and terminating sessions with one or more participants. Presence service may use icons that are preloaded on a device to indicate a personal presence, but, absent additional communication, may provide no additional information to a user or subscriber.

SUMMARY

Embodiments of the present invention include methods for enhancing presence services. A region of a third party is registered in an icon server. Presence data corresponding to the user presence within the registered region is received from a mobile device into the icon server. A custom icon is transmitted from the icon server to the mobile device, which is configured to display the custom icon. A presence publication including a custom icon is received from the mobile device by a presence server. The custom icon, corresponding to the user presence in the registered region, is transmitted from the presence server to a subscriber.

In some embodiments, receiving presence data may include determining a user availability status, wherein if the user availability status is disabled, then the presence data is not received, and wherein if the user availability status is enabled then the presence data is received.

In some embodiments, receiving presence data may include querying the user presence at regular intervals determined by a timer.

In some embodiments, the custom icon may include a graphical display portion and an additional data display portion. In some embodiments, the additional data display portion may include commercial information corresponding to the registered region and a data address configured to provide a network address to remote data.

In some embodiments, the icon server and the presence server may be icon and presence functions, respectively, within a centralized server.

In some embodiments, performance related data corresponding to the third party can be received into the icon server and the custom icon can be modified responsive to the performance related data. In some embodiments, modifying can include receiving user input indicative of a user opinion corresponding to the third party and modifying the custom icon within the mobile device responsive to the user input.

In some embodiments, receiving presence data may include receiving the presence data from the mobile device via the presence server and transmitting the custom icon may include updating a presence icon with the custom icon.

In some embodiments, a presence update and an updated icon may be sent to the subscriber responsive to an updated presence of the mobile device.

In some embodiments, the region may include a geographically defined region and the presence data comprises location data.

In some embodiments of the invention can be computer program products that may include a computer usable storage medium having computer-readable program code embodied in the medium, the computer readable program code configured to perform methods described herein.

Embodiments of the present invention include a system for enhancing presence services. The system may include a presence server configured to determine and communicate, to a subscriber, presence information corresponding to a user mobile device and an icon server configured to associate and store presence information of a third party and a custom icon corresponding to the third party, to modify the custom icon responsive to received data indicative of opinion data corresponding to the third party, and to transmit the custom icon to the user mobile device and to the subscriber.

In some embodiments, the presence server may be configured to determine a user availability status configured to communicate user presence availability, wherein the presence server does not determine the location information if the user availability has a disable state.

In some embodiments, the received data may include performance rating data corresponding to the third party that is provided by previous users.

In some embodiments, the icon server includes a location-based icon server, the presence information of the third party is a geographically defined region, and the presence information of the user mobile device includes location information. The custom icon may be displayed on the user mobile device when the user is in the geographically defined region.

Embodiments of the present invention include a method for enhancing presence services. A custom icon associated with a third party is associated with a region. A user presence in the associated region is communicated by transmitting the custom icon to a subscriber.

In some embodiments, user presence information is received into a presence server from a mobile device and the user presence information is sent to an icon server from the presence server. The user presence information and custom icon are transmitted from the icon server to a subscriber and a presence icon on a display of the mobile device is updated if the user presence information corresponds to the presence data of the associated region.

In some embodiments, community opinion data corresponding to performance of the third party may be received into an icon server. The custom icon may be modified responsive to the community opinion data, wherein the custom icon is rendered on the mobile device and/or a subscriber device to graphically display the community opinion data in the custom icon.

DETAILED DESCRIPTION OF EMBODIMENTS OF THE INVENTION

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

The present invention may be embodied as methods, systems, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

As used herein, "electronic component" means an active device as contrasted with a passive electrical connector or the like. An electronic component may include a processor.

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

When the communication terminal is configured to communicate over a wireless interface, it is referred to herein as a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

Figure 1:
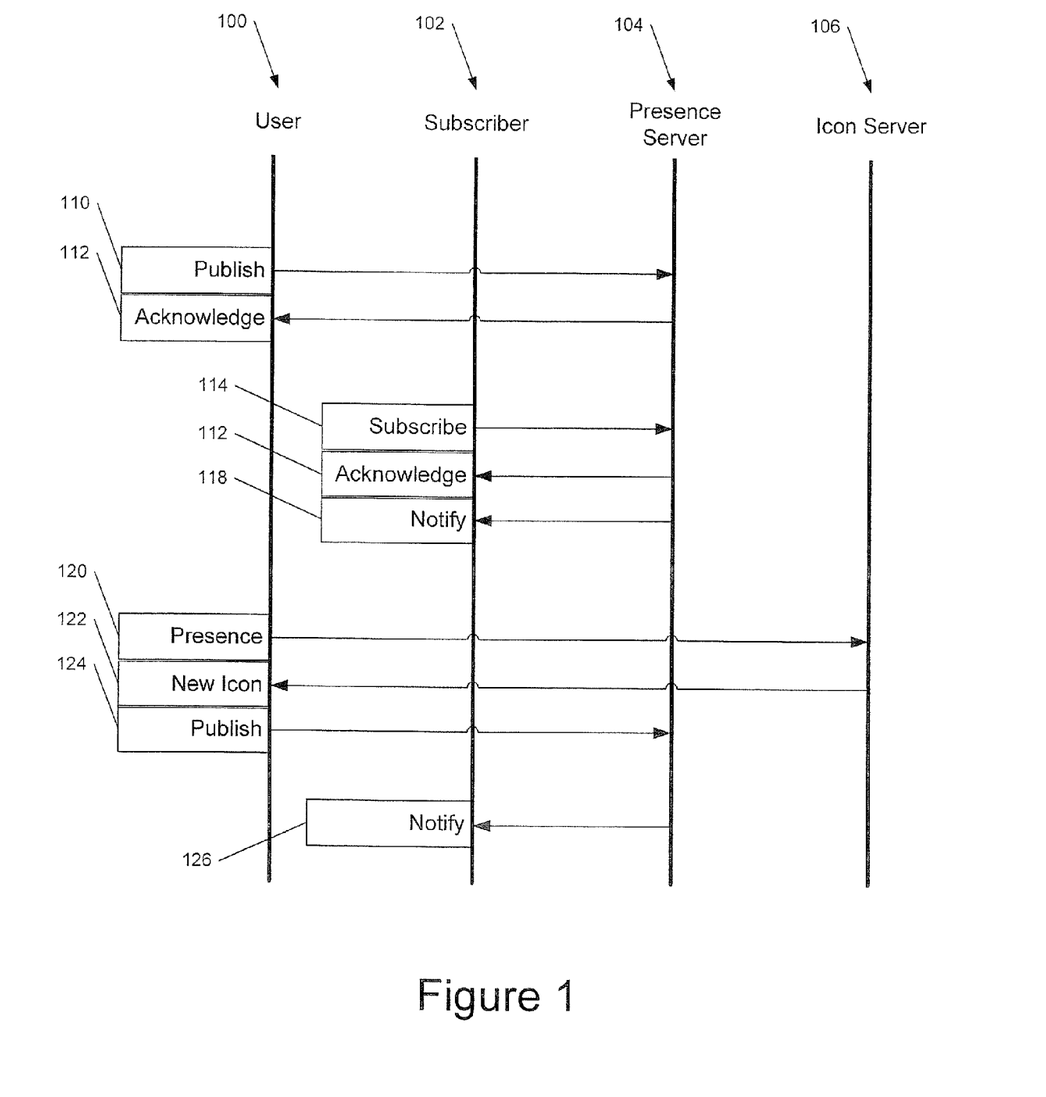
FIG. 1 is a line diagram illustrating exemplary presence service communications according to some embodiments of the present invention.

Referring now to FIG. 1, a line diagram illustrating exemplary presence service communications according to some embodiments of the present invention is illustrated. Vertical lines are illustrated representing a user 100, a subscriber 102, a presence server 104 and an icon server 106. A user 100 may use a mobile device such as a telecommunications and/or data processing device that is communicatively coupled to network and/or system devices and/or components. For example, the mobile device may be a communication terminal and/or a mobile terminal. In some embodiments, such a mobile device may be equipped with location determination capacity. Location determination capacity may include, for example, one or more internal receivers configured to receive positioning and/or other system signals that can be used to determine a location of the device. In some embodiments, location determination capacity may include a receiver configured to receive location data from an external location determination source.

The user 100, via the mobile device, may send a publish communication 110 to a presence server 104. The presence server 104 is configured to provide and receive presence information to and from clients, such as a user 100 and a subscriber 102. The publish communication 110 communicates to the presence server 104 that the user 100 has a presence in a network and/or system. Responsive to the publish communication 110, the presence server 104 sends an acknowledge communication 112 back to the user 100. In some embodiments, receipt of the acknowledge communication 112 may result in the activation of a presence icon in the user's device. In some embodiments, acknowledgment communications 112 may be used responsive to every communication and/or selectively used for specific communications. The presence icon can be, for example, a default icon that may have been previously loaded into the mobile device.

A subscriber 102 can send a subscribe communication 114 to the presence server 104 to establish a subscription to user 100. Responsive to the subscribe communication 114, the presence server 104 may send an acknowledge communication 112 to the subscriber 102. The presence server 104 may, in the form of a notify communication 118, communicate to the subscriber 102 that the user 100 has presence on the network and/or system.

The user 100 can also send a presence communication 120 to an icon server 106. In some embodiments, the presence communication 120 can be sent from the presence server 104 to the icon server 106. The icon server 106 can be configured to register a region of a third party and a corresponding third party custom icon. When the icon server 106 receives presence data from a user 100 that corresponds to the third party region, the icon server 106 can send a custom icon to the user 100. In some embodiments, a region is a geographically defined region corresponding to, for example, a premises of a retail establishment of the third party. The icon server 106 may send a custom icon that represents the retail establishment. The custom icon can replace or supplement a default and/or another custom presence icon on the mobile device.

Responsive to receipt of the custom icon, the user 100 sends another publish communication 124 that includes the custom icon to the presence server 104. The presence server 104 sends the custom icon to a subscriber 102 in the form of a notify communication 126. Based on the custom icon, the subscriber 102 can determine that the user 100 is in a region defined by the third party. In some embodiments, the custom icon can include graphical and additional data. For example, the custom icon can include data including, for example, commercial content related to third party commercial offerings and/or specific premises location of the region. The data can include data address information configured to provide links to additional commercial or non-commercial data, such as data remotely stored on another server and/or similar device. In some embodiments, the region may be virtual, such as, for example, a network online community.

In some embodiments, opinion and/or rating data may be generated within the network and/or system regarding the third party. The rating and/or opinion data can be communicated by modifying the custom icon to reflect an opinion and/or rating. For example, in some embodiments, the custom icon can be supplemented with an additional graphic that can indicate the existence of and/or value of a third party rating. In some embodiments, the custom icon can be graphically modified such as through color enhancement and/or distortion of the icon image. For example, a poor opinion rating could result in a drooping icon image and/or dull colors. Alternatively, the custom icon may be rendered using different background colors to indicate different opinion ratings. In some embodiments, a default presence icon may be rendered in a manner reflective of opinion and/or rating information. In some embodiments, a custom icon may be modified based on an input from the user to convey an opinion and/or emotion, such as, for example, by adding a string of "Zs" to indicate that the user is bored by the environment.

Figure 2:
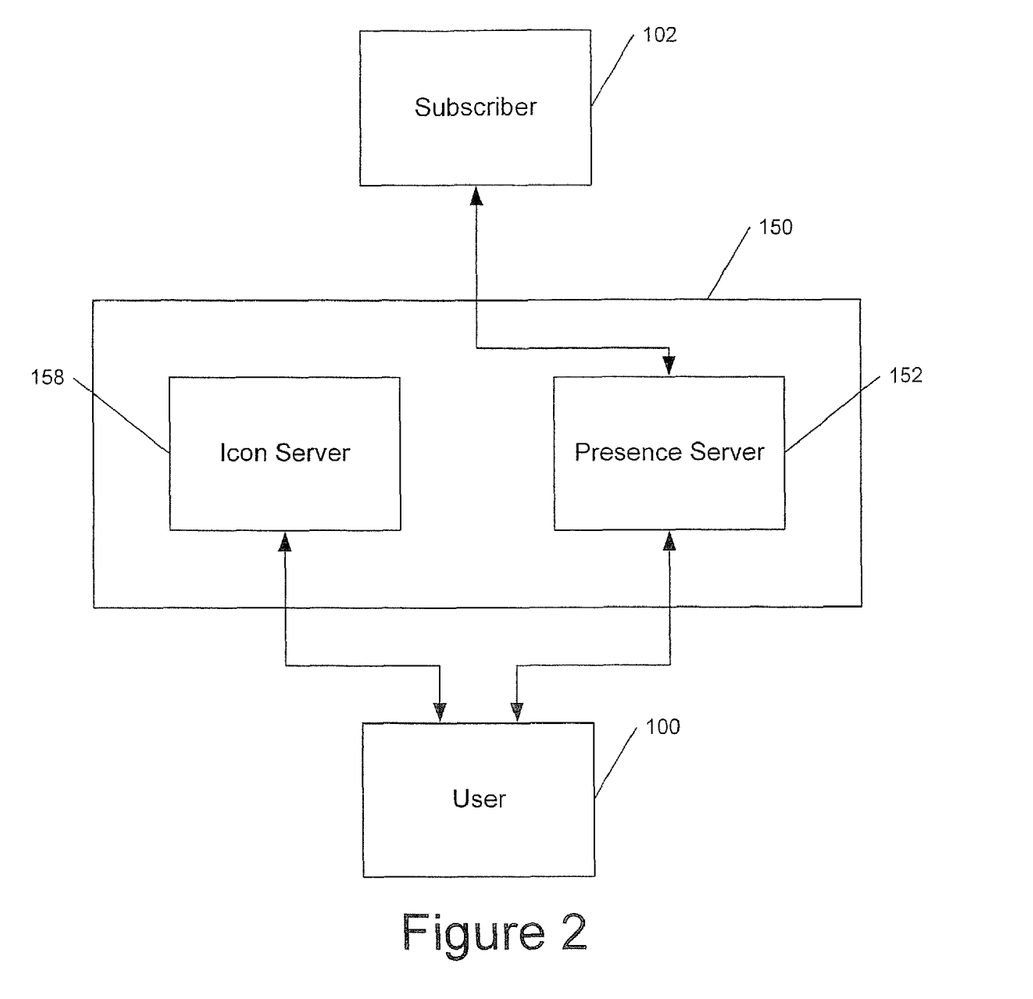
FIG. 2 is a block diagram illustrating a system for enhancing presence services in accordance with some embodiments of the present invention.

Reference is now made to FIG. 2, which is a block diagram illustrating a system for enhancing presence services in accordance with some embodiments of the present invention. The system 150 includes a presence server 152 configured to provide and receive presence information to and from clients, such as a user 100 and a subscriber 102. For example, a presence server 152 may be configured to determine and communicate, to a subscriber 102, presence information corresponding to a user 100. In this manner, the user 100 may publish his presence to the presence server 152, which may notify a subscriber 102 of the user's presence. The user 100 can also send presence data to an icon server 158 in the system 150. In some embodiments, the user's presence data may be transmitted from the presence server 152 to the icon server 158. In addition to receiving user presence data, the icon server 158 may be configured to associate and store presence information and a custom icon of a third party. In some embodiments, the icon server 158 is configured to store location data corresponding to a geographically defined region of a third party.

In some embodiments, the icon server 158 may be configured to receive data corresponding to the third party and modify the custom icon responsive to the received data. Received data may be in the form of performance related data of the third party, such as opinion data provided by previous customers of a retail entity. In some embodiments, the received data may be generated in and/or by a community of users and may constitute performance rating data.

The icon server 158 is further configured to transmit the custom icon to the user 100. In addition to graphical data, the icon may also include and/or be associated with additional data, such as commercial data and/or a data address of a link to additional data. The additional data may include specific region information, such as a premises address and/or location.

In some embodiments, the presence server 152 may be configured to determine a user availability status that may be set by the user 100. For example, a user may set the user availability to a disable state wherein the presence server 152 does not notify any subscribers 102 of the user's presence. In some embodiments, the disable state of the user availability may serve to inhibit the location information of the user 100 while still acknowledging presence in the system 150. Although illustrated as a system 150 including an icon server 158 and a presence server 152, in some embodiments, the functionality of the icon server 158 and the presence server 152 may reside within a central server and/or network component.

In use and operation, a user 100 may publish his presence to the presence server 152 and the icon server 158. The presence published to the icon server 158 may include, for example, location information. The presence of the user 100 may be sent to the subscriber 102 in the form of a notification from the presence server 152. If the user presence corresponds to a third party region, then the icon server 158 may send a custom icon, if available, to the user 100. The custom icon may be transmitted from the user to the presence server 152 and from the presence server 152 to the subscriber 102.

Figure 3:
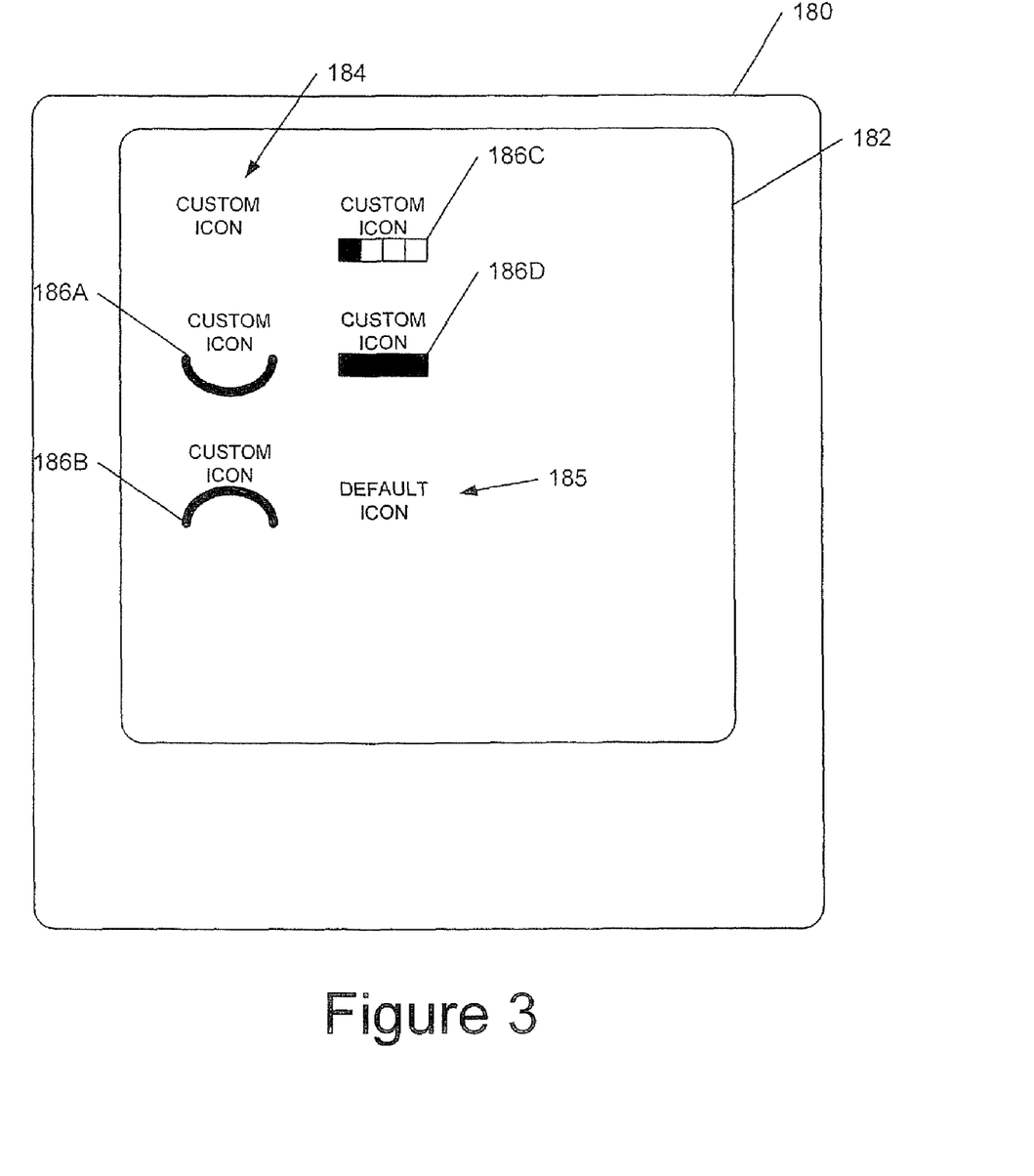
FIG. 3 is a top view of a device having a display according to some embodiments of the present invention.

Reference is now made to FIG. 3, which is a top view of a device having a display according to some embodiments of the present invention. The device 180 includes a display 182 capable of displaying images, such as icons 184-186A-D. The icon can be a default icon 185 that may be stored in the device 180 and used to signal presence in a system, network, and/or region. If the user is in a region associated with a third party (e.g., at a store location), a custom icon 184 can be displayed and/or rendered to indicate presence in the third party region instead of or in addition to the default icon 185. In some embodiments, the custom icon 184 can be modified to reflect rating and/or opinion data. The modification may be in the form of a supplemental graphic that can convey a community opinion of the third party and/or the products and/or services provided thereby. For example, modified custom icon 186A indicating a favorable opinion and/or rating may include a "smile" that may supplement the custom icon 184. Similarly, if the rating and/or opinion is unfavorable, a modified custom icon 186B may include a "frown" image that supplements the custom icon 184.

In some embodiments, a modified custom icon 186C, 186D may include a supplemental image to communicate degrees of favorability on an rating/opinion scheme, such as, for example, through a bar graph. The custom icon 184 may also be modified to communicate rating and/or opinion information in a manner that does not include a supplemental image. For example, the custom icon image 184 may be made to droop, sag, run, and/or blur based on unfavorable rating and/or opinion data. In some embodiments, the custom icon 184 can be modified by varying the shades of the icon colors and/or a background thereof.

Figure 4:
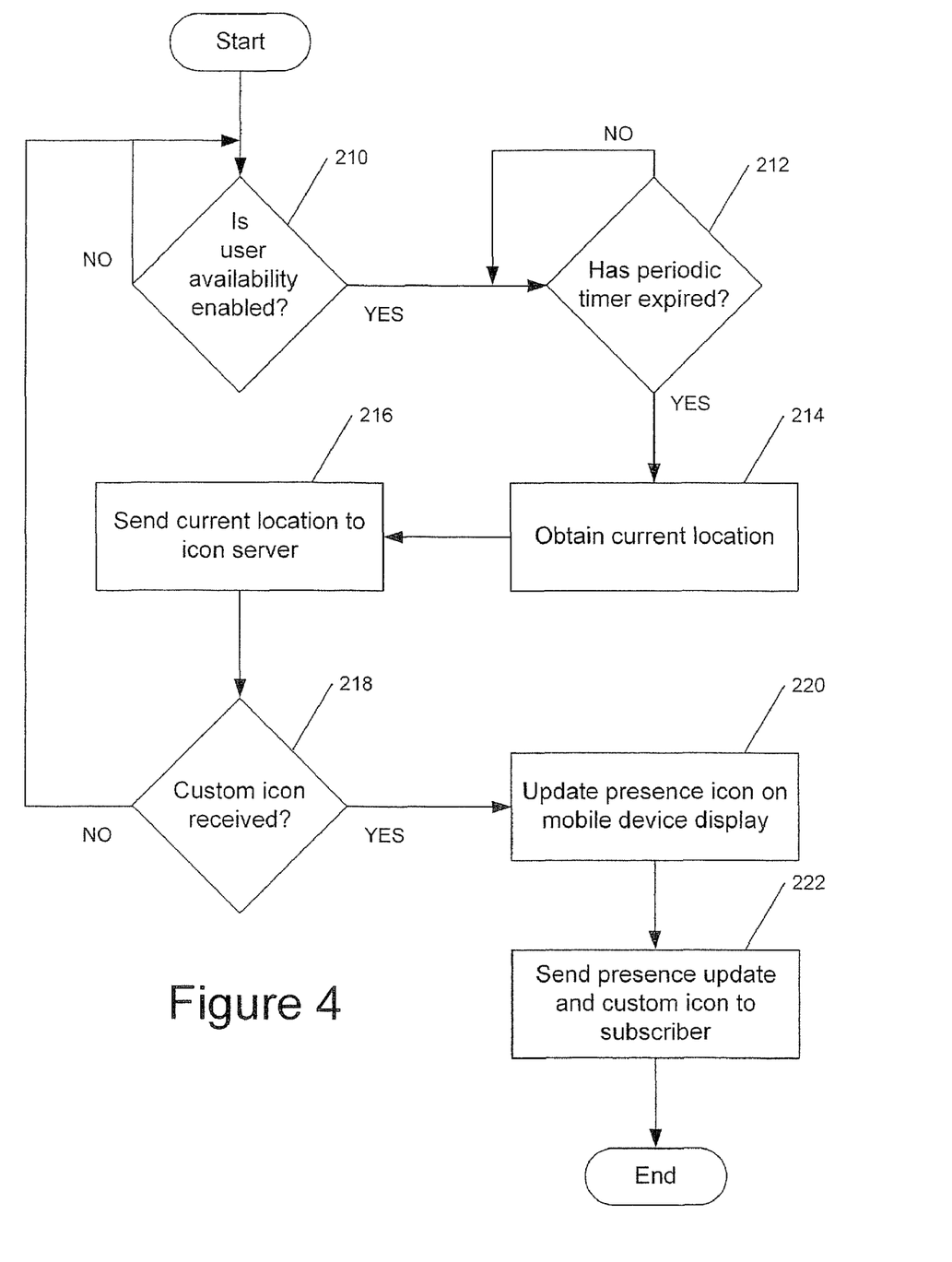
FIG. 4 is a flow diagram illustrating operations for updating a custom icon according to some embodiments of the present invention.

Reference is now made to FIG. 4, which is a flow diagram illustrating operations for updating a custom icon according to some embodiments of the present invention. Operations begin with determining if a user availability is enabled (block 210). If the user availability is not enabled then the operations may continue to determine user availability without performing any further actions. If the user availability is enabled then a periodic timer may be checked to see if the timer has expired (block 212). The periodic timer can be used to establish an interval at which a user location is obtained. If the timer is not expired then the operation may continue to monitor the timer until such time as the timer is expired.

When the periodic timer expires, the current location of the user is obtained (block 214). The current location may be determined using location determination components that are internal or external to the user mobile device. For example, a mobile device may include positioning technology such as Global Positioning System (GPS). In some embodiments, the location determination may be made in a communication network via triangulation techniques using communications with multiple communication transceivers. In some embodiments, the location can be manually entered into the mobile device by the user.

The current location may be transmitted to an icon server (block 216). The icon server may compare the current location to regions that have been previously registered by third parties. In some embodiments, the regions may be geographically defined regions that correspond to third party facilities and/or premises. In some embodiments, a region may be a virtual region defined by access rights to defined network and/or system clients, components, servers, communities, and/or other services. The icon server may also associate a custom icon with a third party region and transmit a custom icon to the user.

If the user is in a region that corresponds to a custom icon then the icon may be sent to the user. If a custom icon is not received then further operations are not performed and the previous operations may be repeated (block 218). If a custom icon is received by the user, then the presence icon is updated on a display of the user mobile device (block 220). The presence icon may be updated from a default presence icon or from another custom icon that was previously provided by the icon server. The presence update and custom icon is sent to a subscriber (block 222). In some embodiments, the presence update and custom icon may be sent directly to a subscriber. In some embodiments, the presence update and custom icon may be sent via publishing it to the to the presence server.

Figure 5:
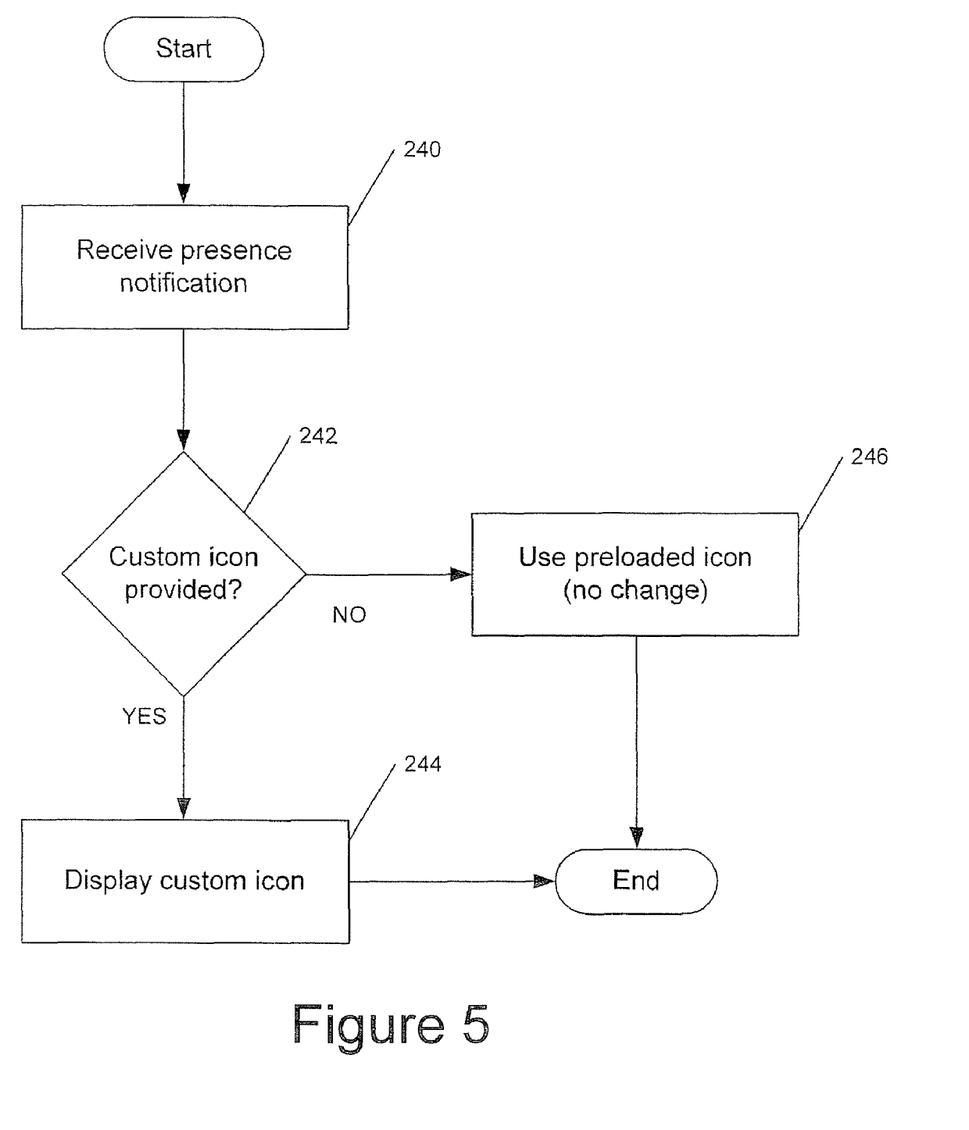
FIG. 5 is a flow diagram illustrating operations for updating a custom icon for subscribers according to some embodiments of the present invention.

Brief reference is now made to FIG. 5, which is a flow diagram illustrating operations for updating a custom icon for subscribers according to some embodiments of the present invention. A subscriber receives a presence notification from the presence server (block 240). The subscriber device determines if a custom icon is provided (block 242). If no custom icon is provided then a preloaded icon is displayed or continues to be displayed (block 246). If a custom icon is provided, then the custom icon is displayed (block 244). In this manner, the custom icon may graphically communicate to the subscriber the presence and location (geographic and/or virtual) of the user.

Figure 6:
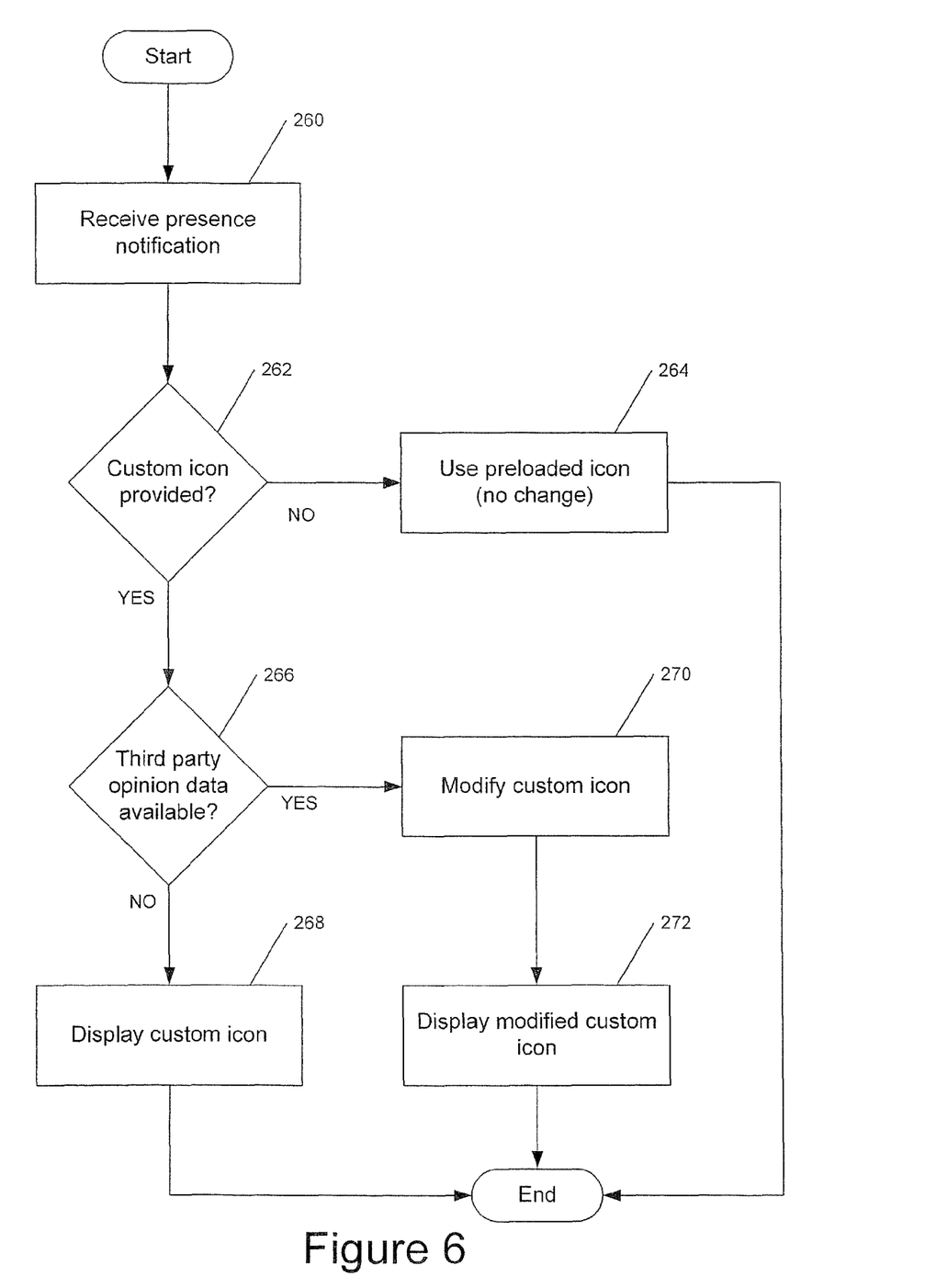
FIG. 6 is a flow diagram illustrating operations for updating a custom icon based on third party data according to some embodiments of the present invention.

Reference is now made to FIG. 6, which is a flow diagram illustrating operations for updating a custom icon based on third party data according to some embodiments of the present invention. A subscriber receives a presence notification from the presence server (block 260). The subscriber device determines if a custom icon is provided (block 262). If no custom icon is provided then a preloaded icon is displayed or continues to be displayed (block 264). If a custom icon is provided, then the subscriber device determines if third party opinion data is available (block 266). Third party opinion data may be community generated feedback and/or performance data that may be expressed, for example, as a rating. If the third party opinion data is unavailable then the custom icon is displayed (block 268). If third party opinion data is available, then the custom icon is modified responsive to the opinion data (block 270). A modification of the custom icon can include, for example, adding supplemental graphic content and/or rendering the custom icon differently.

Figure 7:
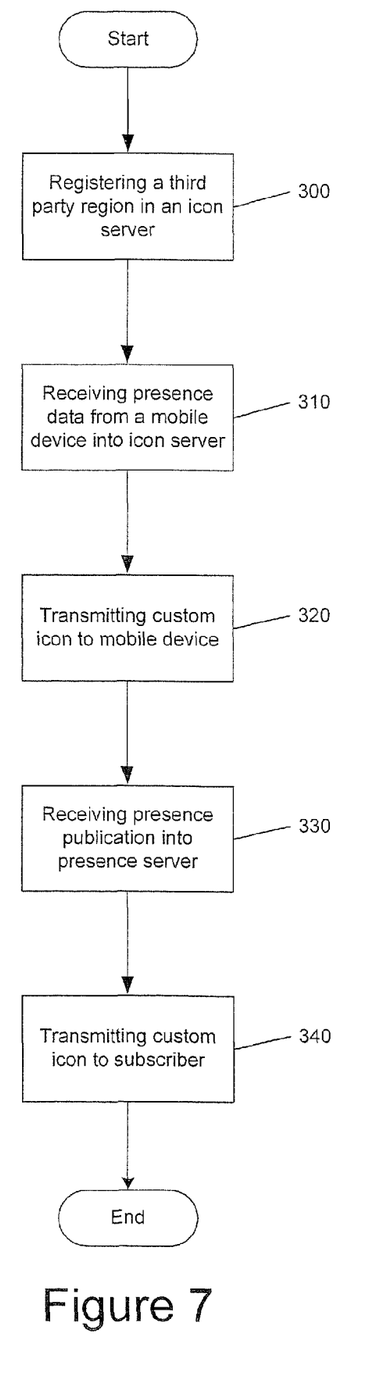
FIG. 7 is a block diagram illustrating operations for enhancing presence services according to some embodiments of the present invention.

Reference is now made to FIG. 7, which is a block diagram illustrating operations for enhancing presence services according to some embodiments of the present invention. A region corresponding to a third party is registered in an icon server (block 300). The registering can include providing a custom icon corresponding to the third party and/or the region. In some embodiments, a custom icon may include a graphical portion and an additional data portion. The additional data portion of some embodiments may include commercial information corresponding to the region and/or a data address configured to provide a link to remotely located data. A region may be a geographically defined region and/or a virtually defined region, such as an online community, for example.

Presence data may be received into the icon server from a mobile device (block 310). The presence data may correspond to the presence of a user that is in the third party region. In some embodiments, the presence data is user location data and the region is a geographically defined region. Receiving the presence data may also include determining a user availability status. For example, if the user availability status is disabled then the presence data is not received into the icon server, whereas if the user availability status is enabled the presence data may be received into the icon server. In some embodiments, receiving the presence data may include obtaining user presence information at regular intervals that may be determined by, for example, a timer and/or timer module and/or program. The presence data may also be received from the mobile device via a presence server.

A custom icon may be transmitted to the mobile device by the icon server if the user presence corresponds to a third party region (block 320). In some embodiments, the custom icon may be used to update an existing presence icon. A presence publication is received by a presence server from the mobile device (block 330). In some embodiments, the presence server and the icon server may be presence and icon functions, respectively, provided within a centralized server.

The custom icon, corresponding to the user's presence in the third party region, is transmitted from the presence server to a subscriber (block 340). In this manner, the custom icon may be displayed on a subscriber device to indicate the presence of the user within the third party region.

In some embodiments, performance related data that corresponds to the third party may be received into the icon server. The custom icon may be modified responsive to the performance related data. A client group and/or community may provide feedback related to services, products, etc. provided by the third party and the feedback may be aggregated into a rating and/or opinion value. The custom icon may be modified to reflect the rating and/or opinion such that a user and a subscriber that receive the custom icon will receive a graphical indication of the rating and/or opinion of the third party. In a non-commercial context, a rating and/or opinion regarding a user may also be communicated by modifying an icon. For example, in an online community a user may be rated based on any of a variety of criteria including, for example, courtesy, responsiveness, and frequency of contributions, among others.

Figure 8:
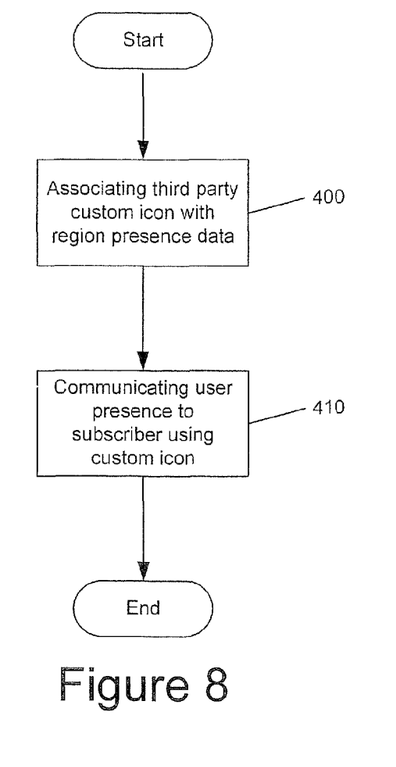
FIG. 8 is a block diagram illustrating operations for enhancing presence services according to some other embodiments of the present invention.

Reference is now made to FIG. 8, which is a block diagram illustrating operations for enhancing presence services according to some other embodiments of the present invention. A third party custom icon corresponding to a third party is associated with a the third party region presence data in a database (block 400). In some embodiments, user presence information may be received into a presence server from a mobile device and sent to an icon server from the presence server. A user presence is communicated, using the custom icon, to a subscriber (block 410). In some embodiments, the user presence information and the custom icon are transmitted to the subscriber and the presence icon on a display of the mobile device is updated if the presence information corresponds to the presence data of the region.

In some embodiments, community opinion data is received into an icon server from a user community. The opinion data may include data corresponding to performance of the third party. The custom icon may be modified responsive to the community opinion data. In this manner, the custom icon may be rendered on the mobile device and/or a subscriber device that graphically displays the community opinion data in the custom icon.

As will be appreciated by one of skill in the art, the present invention may be embodied as a method, system, mobile terminal or computer program product. Accordingly, the present invention may take the form of an entirely hardware embodiment, an entirely software embodiment or an embodiment combining software and hardware aspects, all generally referred to herein as a "circuit" or "module."

Embodiments according to the present invention are described with reference to block diagrams and/or operational illustrations of methods and communication terminals. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, or semiconductor system, apparatus, or device. More specific examples (a nonexhaustive list) of the computer-readable medium include the following: hard disks, optical storage devices, magnetic storage devices, a portable computer diskette, a random access memory (RAM), a read-only memory (ROM), an erasable programmable read-only memory (EPROM or Flash memory), and a compact disc read-only memory (CD-ROM).

Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package.

The computer program instructions may also be loaded onto a computer or other programmable data processor to cause a series of operational steps to be performed on the computer or other programmable processor to produce a computer implemented process such that the instructions which execute on the computer or other programmable processor provide steps for implementing the functions or acts specified in the flowchart and/or block diagram block or blocks.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method for enhancing presence services, comprising:
registering a region of a third party in an icon server;
receiving, into the icon server, presence data from a mobile device corresponding to a user presence within the registered region;
transmitting a custom icon that corresponds to the third party from the icon server to the mobile device configured to display the custom icon;
receiving a presence publication into a presence server from the mobile device, wherein the presence publication include the custom icon that was transmitted from the icon server to the mobile device, wherein the presence server is separate from the icon server; and
transmitting the custom icon that was received from the mobile device and that corresponds, to the user presence in the registered region, from the presence server to a presence server subscriber that can determine that the user is in a region defined by the third party.

2. The method of claim 1, wherein receiving presence data further comprises determining a user availability status, wherein if the user availability status is disabled, then the presence data is not received, and wherein if the user availability status is enabled then the presence data is received.

3. The method of claim 1, wherein receiving presence data comprises querying the user presence at regular intervals determined by a timer.

4. The method of claim 1, wherein the custom icon comprises a graphical display portion and an additional data display portion.

5. The method of claim 4, wherein the additional data display portion comprises commercial information corresponding to the registered region and a data address configured to provide a network address to remote data.

6. The method of claim 1, further comprising receiving performance related data into the icon server that corresponds to the third party and modifying the custom icon responsive to the performance related data.

7. The method of claim 6, wherein the modifying comprises receiving user input indicative of a user opinion corresponding to the third party and modifying the custom icon within the mobile device responsive to the user input.

8. The method of claim 1, wherein the receiving presence data comprises receiving the presence data from the mobile device via the presence server and wherein the transmitting the custom icon comprises updating a presence icon with the custom icon.

9. The method of claim 1, further comprising sending a presence update and an updated icon to the presence server subscriber responsive to an updated presence of the mobile device.

10. The method of claim 1, wherein the registered region comprises a geographically defined region and the presence data comprises location data.

11. A computer program product, the computer program product comprising a computer usable storage medium having computer-readable program code embodied in the medium, the computer readable program code configured to perform the method of claim 1.

12. A system for enhancing presence services, comprising:
a presence server configured to determine and communicate, to a presence server subscriber, presence information corresponding to a user mobile device; and
an icon server that is separate from the presence server and that is configured to associate and store presence information of a third party and a custom icon corresponding to the third party, to modify the custom icon responsive to received data indicative of opinion data corresponding to the third party, and to transmit the custom icon to the user mobile device, wherein the user mobile device transmits the custom icon received from the icon server to the presence server subscriber that can determine that the user mobile device is in a region defined by the third party.

13. The system of claim 12, wherein the presence server is further configured to determine a user availability status, configured to communicate user presence availability, wherein the presence server does not determine the location information if the user availability has a disable state.

14. The system of claim 12, wherein the received data comprises performance rating data corresponding to the third party that is provided by previous users.

15. The system of claim 12, wherein the icon server comprises a location-based icon server, wherein the presence information of the third party comprises a geographically defined region, and wherein the presence information of the user mobile device comprises location information and the custom icon is displayed on the user mobile device when the user is in the geographically defined region.

16. A method for enhancing presence services, comprising:
associating, in a database, a custom icon associated with a third party and a virtually defined region;
receiving, into a presence server from a mobile device, user presence information;
sending, from the presence server, to an icon server that is separate from the presence server, the user presence information; transmitting, from the icon server to a presence server subscriber, the user presence information, wherein the transmitted user presence information include the custom icon;
updating a presence icon on a display of the mobile device with the custom icon if the user presence information is within the presence data of the associated region; and
communicating a user presence in the associated region by transmitting a custom icon to the presence server subscriber that can determine that the user mobile device is in a region defined by the third party.

17. The method of claim 16, further comprising:
receiving into an icon server from a user community, community opinion data corresponding to performance of the third party; and
modifying the custom icon responsive to the community opinion data, wherein the custom icon is rendered on the mobile device and/or a subscriber device to graphically display the community opinion data in the custom icon.

18. A computer program product, the computer program product comprising a computer usable storage medium having computer-readable program code embodied in the medium, the computer readable program code configured to perform the method claim 16.

* * * * *

UNITED STATES PATENT AND TRADEMARK OFFICE
CERTIFICATE OF CORRECTION

| | | |
|---|---|---|
| PATENT NO. | : 7,770,137 B2 | Page 1 of 1 |
| APPLICATION NO. | : 11/613606 | |
| DATED | : August 3, 2010 | |
| INVENTOR(S) | : Forbes et al. | |

It is certified that error appears in the above-identified patent and that said Letters Patent is hereby corrected as shown below:

In the Claims:

Column 11, Claim 1, Line 22: Please correct "include the"
                                          to read -- includes the --

Column 12, Claim 16, Line 44: Please correct "include the"
                                          to read -- includes the --

Column 12, Claim 18, Line 64: Please correct "method claim 16."
                                          to read -- method of claim 16. --

Signed and Sealed this
Twenty-fifth Day of December, 2012

David J. Kappos
*Director of the United States Patent and Trademark Office*